United States Patent
Brodowski

(10) Patent No.: US 7,455,470 B2
(45) Date of Patent: Nov. 25, 2008

(54) SWIVEL BALL BEARING

(76) Inventor: John Brodowski, 81 Mobrey La., Smithtown, NY (US) 11787

( * ) Notice: Subject to any disclaimer, the term of this patent is extended or adjusted under 35 U.S.C. 154(b) by 0 days.

(21) Appl. No.: 11/635,727

(22) Filed: Dec. 8, 2006

(65) Prior Publication Data

US 2007/0134056 A1    Jun. 14, 2007

(51) Int. Cl.
*F16C 11/06* (2006.01)
(52) U.S. Cl. .................... 403/135; 403/122; 384/49
(58) Field of Classification Search ............. 403/26, 403/121, 122, 135; 384/49, 495; 463/37, 463/38; D14/412; 345/161, 164, 167; 700/85; 464/132
See application file for complete search history.

(56) References Cited

U.S. PATENT DOCUMENTS

| | | | | |
|---|---|---|---|---|
| 1,044,771 | A * | 11/1912 | Gaskill | 403/135 |
| 1,551,324 | A * | 8/1925 | Offerdahl | 403/135 |
| 2,089,439 | A * | 8/1937 | Silberstein | 403/122 |
| 2,696,392 | A * | 12/1954 | Case | 403/135 |
| 5,076,412 | A * | 12/1991 | Huber | 193/35 MD |
| 5,096,308 | A * | 3/1992 | Sundseth | 384/49 |
| 5,538,346 | A * | 7/1996 | Frias et al. | 384/49 |
| 6,409,388 | B1 * | 6/2002 | Lin | 384/49 |

* cited by examiner

*Primary Examiner*—Michael P Ferguson

(57) ABSTRACT

A swivel bearing assembly consists of an outer housing, a ball and a shaft, a cover, and ball bearings, wherein a free-zone channel.

A free-zone channel allows the ball bearings to roll freely in the assembly as they follow the motion of the ball and shaft. The ball bearings eliminate friction between ball and outer housing. The ball and shaft can have simultaneous rotational and angular motion. Only unidirectional load can be applied to the bearing in the direction of the mounting surface.

4 Claims, 7 Drawing Sheets

SWIVEL BALL BEARING

BACKGROUND OF THE INVENTION

1. Field of the Invention

The present invention relates to ball joints having ball bearings as a friction-reducing medium and, more particularly, to the ball bearings' ability to freely circulate without being trapped between the concave portion of housing and large ball.

2. Description of Prior Art

Various kinds of prior art ball joints with ball bearings have been proposed and developed.

U.S. Pat. No. 6,409,388 to Lin

U.S. Pat. No. 5,096,308 to Sundseth

U.S. Pat. No. 5,076,412 to Huber—In this invention, the ball bearings have a channel and roll in one plane only.

However, the typical prior art designs do not allow the ball bearings (small balls) to freely circulate between the concave housing and large ball.

Prior art ball joints with a full complement of ball bearings which completely fill the space between the housing and the large ball, and without a special channel which would permit their free movement, would in reality be inoperable.

Prior art ball joints with ball bearings, as depicted on FIG. 6, do not support the load, arrow 19, with as many balls as the present invention, depicted on FIG. 5 where load is indicated by arrow 16.

SUMMARY OF THE INVENTION

A bearing (ball joint) with ball bearings is presented. The main feature of this design is a "free zone" channel. The cross-section of the "free zone" channel is larger than the diameter of the ball bearings in order to accommodate their free movement in the channel. The ball bearings can flow into and out of the "free-zone" channel during angular displacement of the ball and shaft.

During rotational motion of the ball and shaft, the ball bearings mimic the motion of prior-art radial bearings. It is essential that each swivel bearing assembly has less than a fill complement of ball bearings. A full complement of ball bearings would impede the balls' free movement and cause that ball bearing assembly to jam.

For optimum function of the swivel bearing, the correct number of ball bearings for each bearing assembly must be determined. The inside diameter in the cover is smaller than the ball's diameter so that the integrity of the assembly is retained. The housing and cover can be assembled either by screws or by electron beam welding. The housing and cover have a self-locating feature for the purpose of assembly.

DETAILED DESCRIPTION OF THE INVENTION

Figure 1:
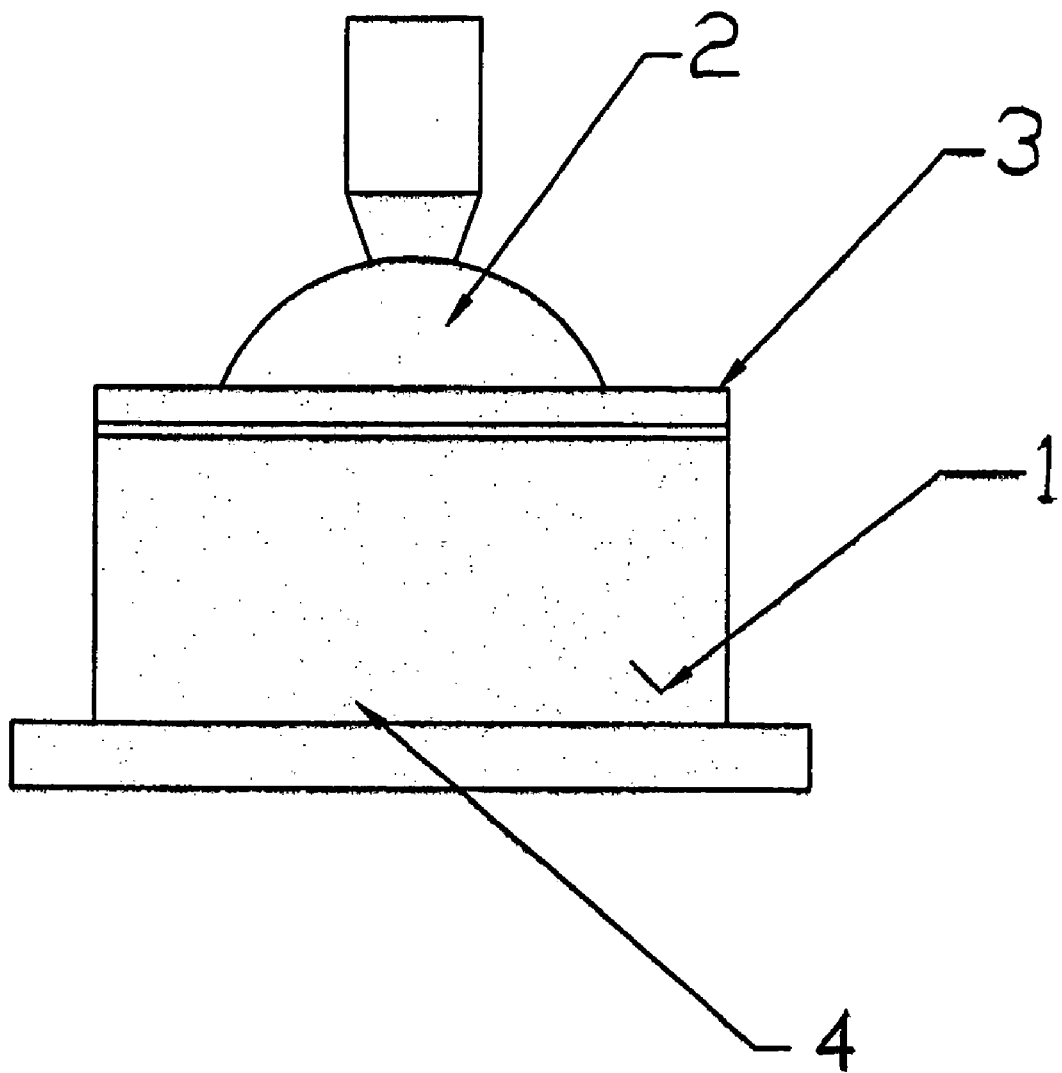
FIG. 1 Assembly of the ball joint

The device shown on FIG. 1 includes housing 1; shaft and ball 2; cover 3; and ball bearings 4 (not shown on FIG. 1).

Figure 1A:
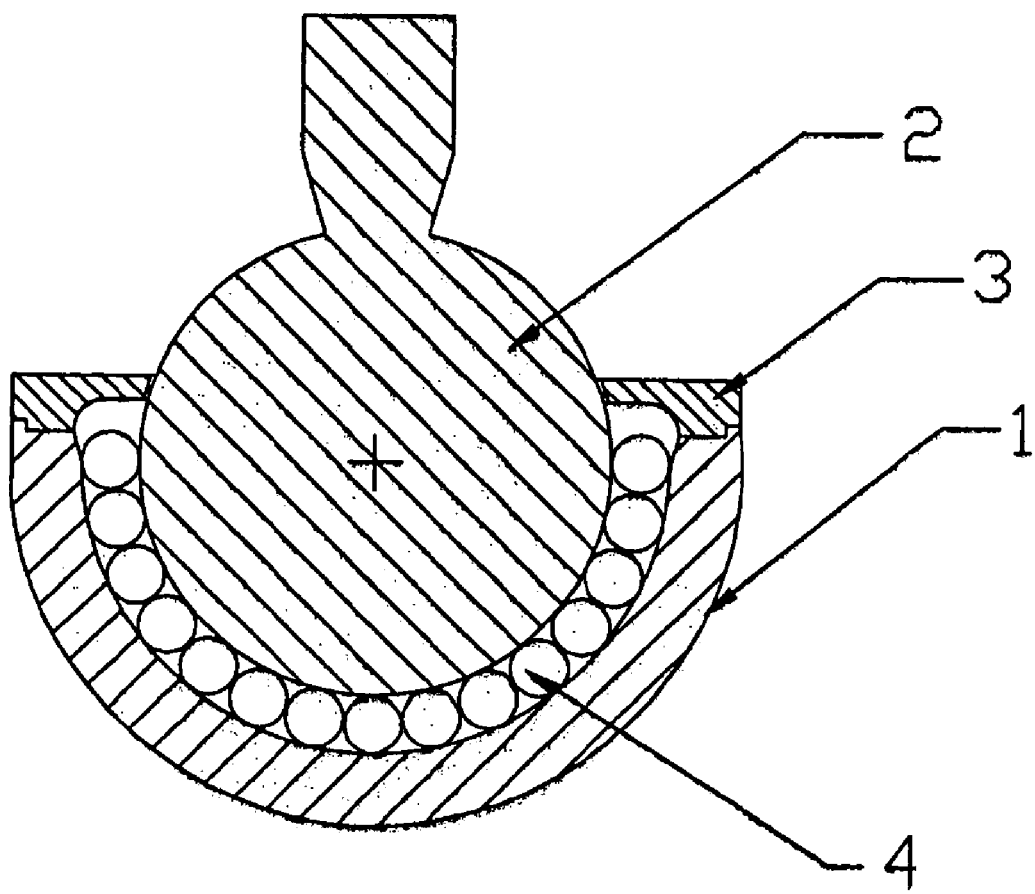
FIG. 1A Cross sectional assembly of the ball joint with different type of housing FIG. 2 Exploded cross sectional view of the ball joint FIG. 3 Detailed cross sectional view of free zone channel in housing and in cover FIG. 4 Cross sectional view of ball and shaft in rotational motion FIG. 5 Cross sectional view of ball and shaft in angular motion FIG. 6 Cross sectional view of prior art ball joint
Figure 2:
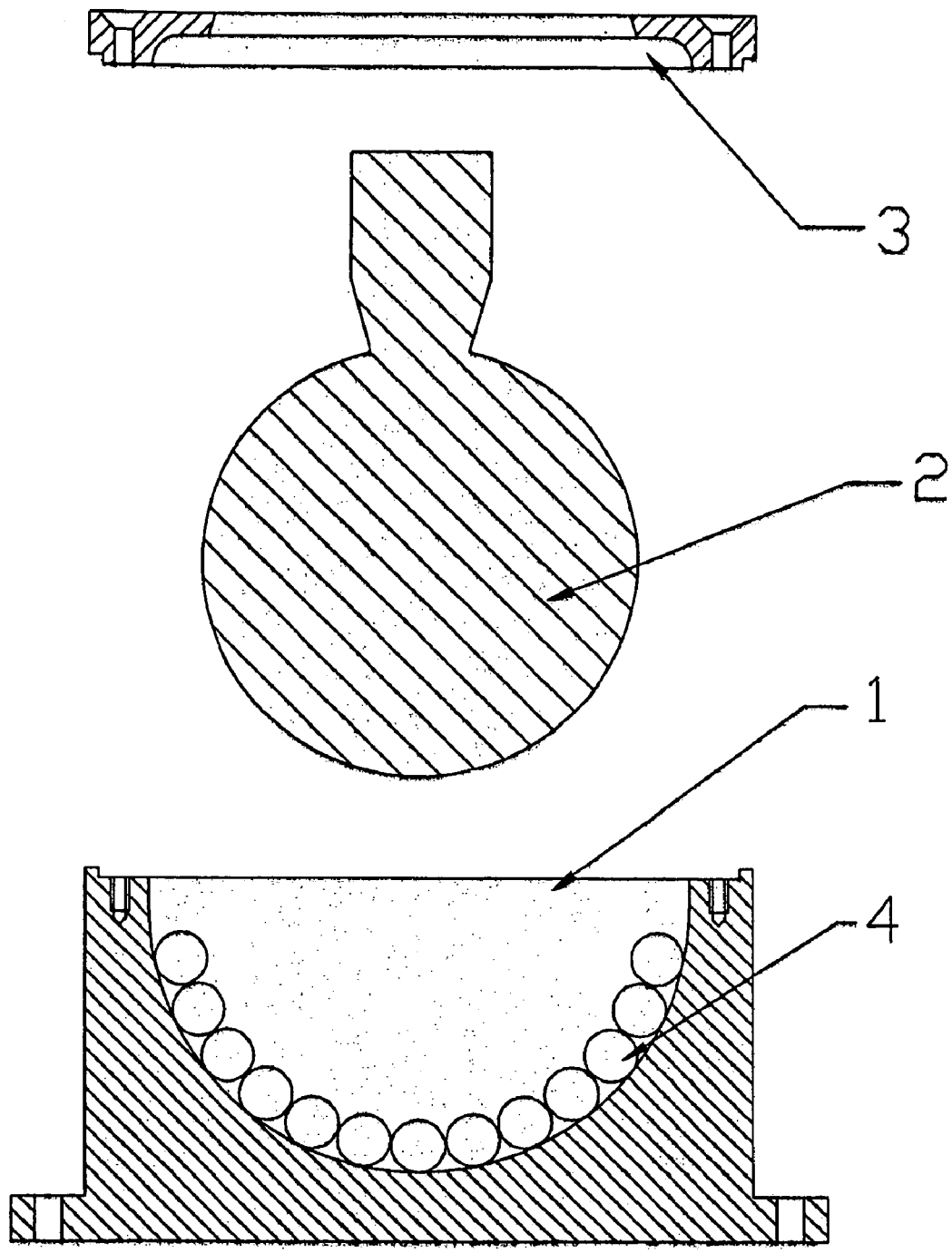

The device shown on FIG. 1A is identical to the device shown on FIG. 1, except for shape of housing 1. Operationally, the two devices behave identically. Cross-section of the device is shown on FIG. 1A, and an exploded view of the device is shown on FIG. 2. FIG. 1A shows ball and shaft 2, resting on ball bearings 4. Ball bearings 4, are in contact with concave seat machined in housing 1. In order for any bearing device to work properly, ball bearings must be allowed to rotate and translate in the channel. Prior art bearing devices accommodate ball bearings' rotation and translation in specially designed channels. The device shown on FIGS. 1 and 1A, having a unique free zone channel, accomplishes the required criteria for free ball bearing movement. The free zone channel can be machined in either housing, FIG. 3 and FIG. 3A, as indicated by arrow 1A, or can be machined in the cover, FIG. 3 and FIG. 3B, as indicated by arrow 1B.

Figure 3B:
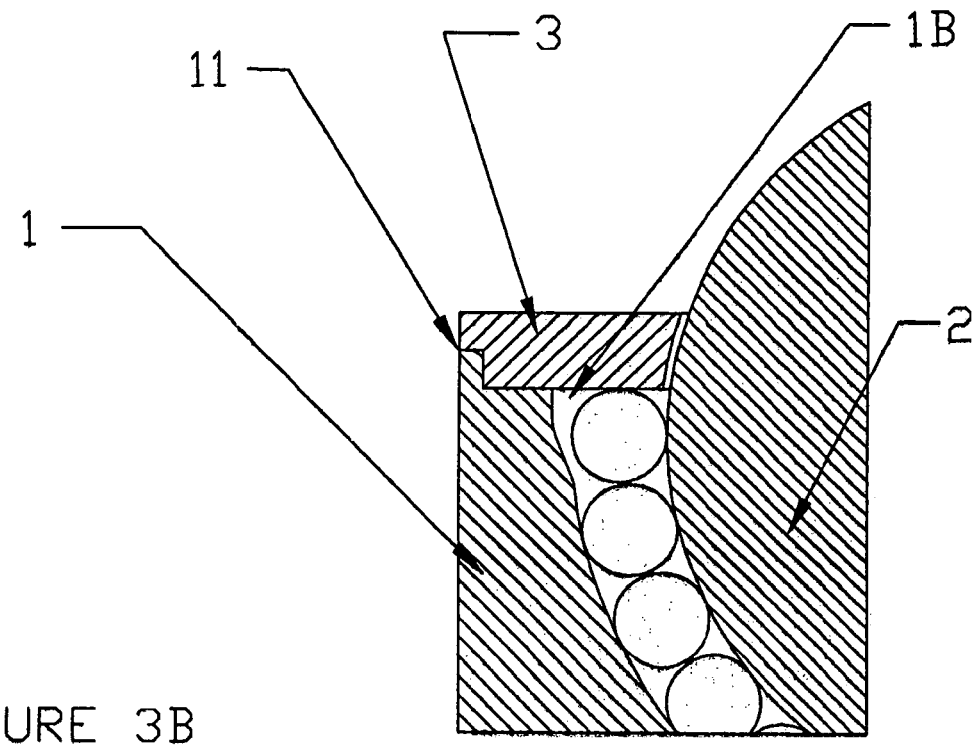
Figure 3A:
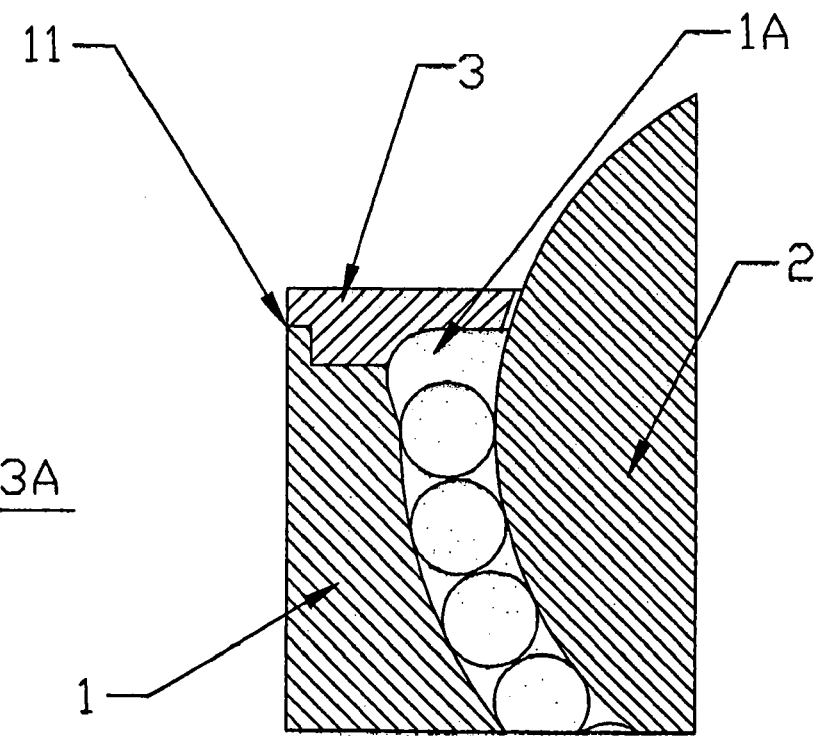

The cross-section of the free zone channel in housing, FIG. 3A, arrow 1A, or in the cover, FIG. 3B, arrow 1B, must be larger than the diameter of the ball bearings in order to accommodate their free movement into and out of the free zone channel.

Figure 4:
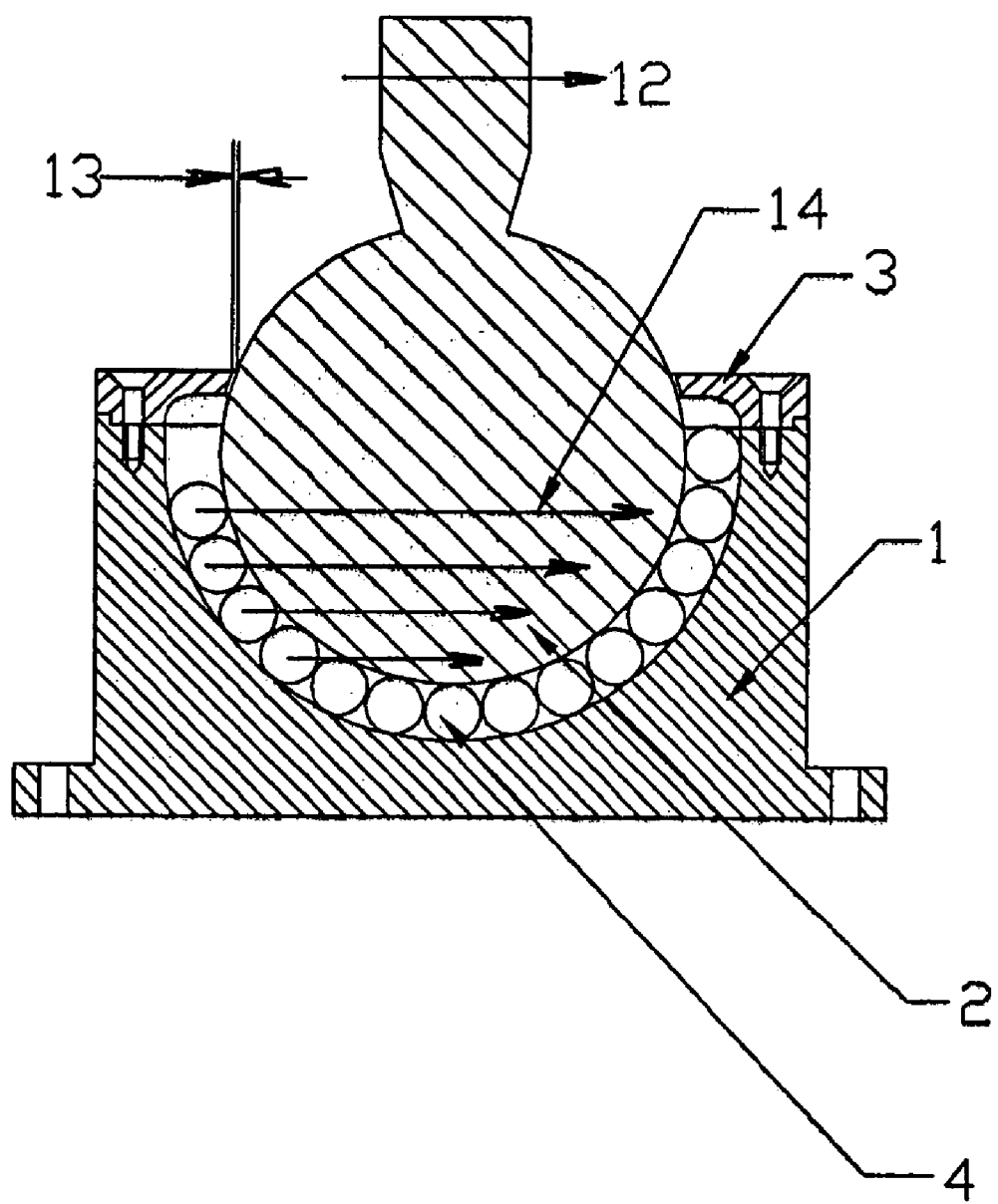

FIG. 4 shows ball and shaft 2, in pure rotation, indicated by arrows 12 and 14. In this mode of operation, the device behavior is identical to that of prior art bearing assemblies in which ball bearings rotate and translate in a circumferential manner, as shown by arrow 14.

Figure 5:
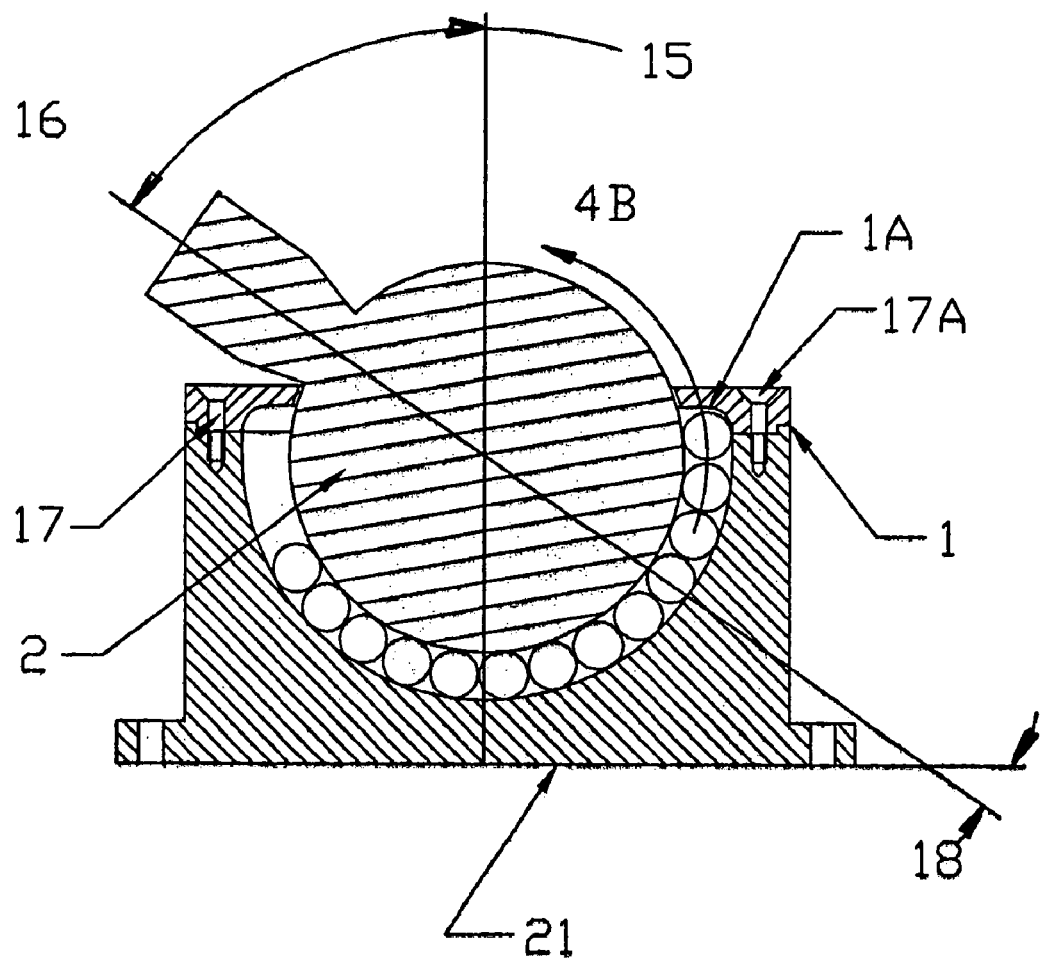
Figure 6:
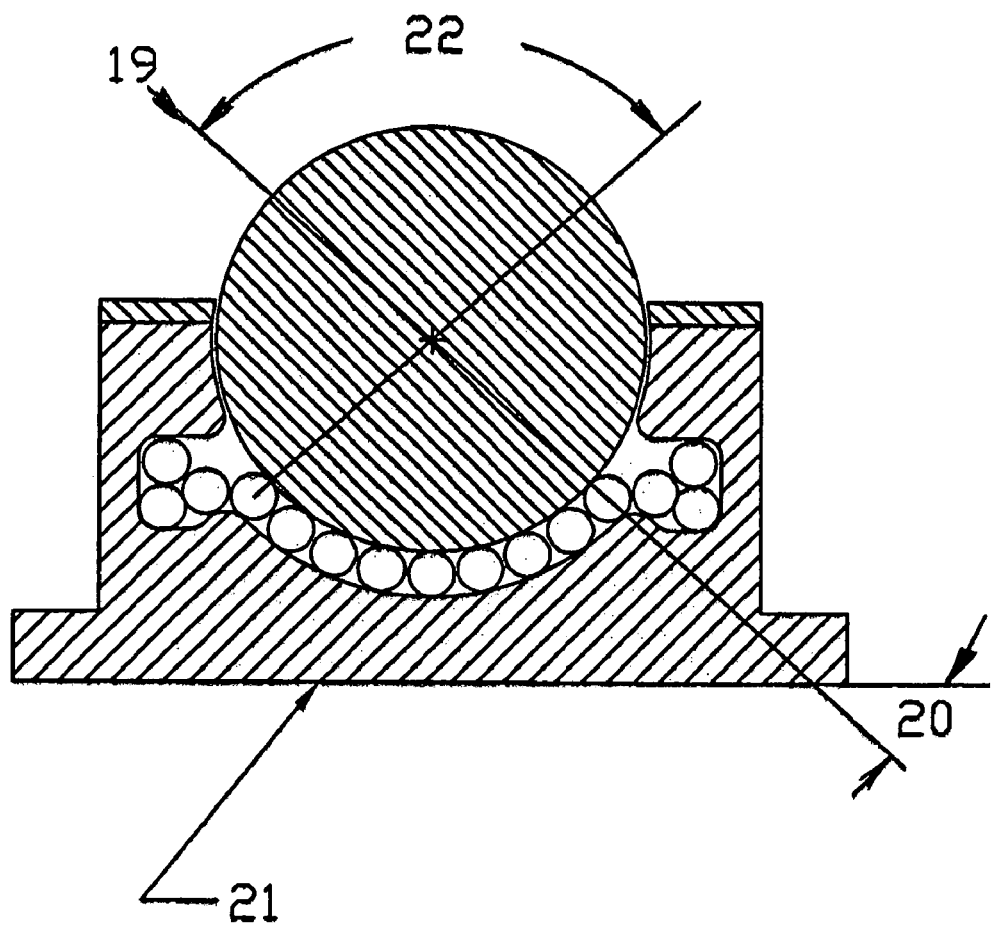

FIG. 5 shows ball and shaft 2, in pure angular translation, indicated by arrows 15 and 18. As the ball and shaft translates through the angle indicated by arrow 18, the ball bearings then move into the free zone channel, as indicated by arrows 1A, and 4B.

When directional translation by the ball and shaft is reversed, the ball bearings also reverse rotation and translation and move into the opposite side of the free zone channel.

During simultaneous rotational and angular motion of the ball and shaft, the ball bearings behave as described above for individual rotation and angular motions.

It is essential that each swivel bearing assembly, FIGS. 1 and 1A, contains a specific number of ball bearings. A full complement of ball bearings filling the space between the ball and shaft and the free zone channel would impede the ball bearings' movement and render the device inoperable.

In order for the ball and shaft 2, to remain captured in the assembly, the cover opening on FIG. 4, indicated by arrow 13, must be smaller than the diameter of the ball on 2.

When load is applied to the ball and shaft, indicated by arrow 16 in FIG. 5, the load is fully supported by the ball bearings.

The cover can be assembled either with fasteners, indicated by arrow 17, or electron-beam welded along the perimeter of the self-locating seat, arrow. 17A, FIG. 5.

The invention claimed is:

1. A ball joint bearing assembly comprising:

a ball pivot comprising a ball and a shaft fixed to a first member;

a housing comprising an outer mounting surface mounted to a second member, a housing opening opposite the mounting surface and a hemispherical concave surface for receiving the ball of the ball pivot within the housing with the ball pivot shaft extending through the opening for pivotally connecting the first member to the second member, a cavity being defined between the entire concave surface and the ball, the cavity rotatably receiving ball bearings contacting the concave surface of the housing and the ball of the ball pivot;

a cover attached to the housing, the cover comprising a cover opening aligned with the housing opening, wherein the ball pivot shaft extends through the cover opening, and an inner diameter of the cover opening is smaller than the diameter of the ball of the ball pivot in order to retain the ball pivot within the housing;

a free-zone channel comprising:

an annular housing free-zone channel portion recessed into the concave surface of the housing receiving the ball bearings, the housing free-zone channel portion extending circumferentially around the entire periphery of the housing opening, and an annular cover free-zone channel portion recessed into the cover receiving the ball bearings, the cover free-zone channel portion correspondingly adjoining the housing free-zone channel portion, the cover free-zone channel portion being concentrically aligned with and a larger diameter than the concave surface of the housing such that the ball bearings freely move between the free-zone channel and the cavity;

wherein the cross sectional size of the free-zone channel is larger than the diameter of the ball bearings in order to facilitate movement of the ball bearings within the channel;

a plurality of ball bearings disposed within the housing, substantially filling the cavity and the free-zone channel such that the ball bearings are free to rotate and translate within and between the cavity and the free-zone channel;

wherein the ball bearings are free to follow the motion of the ball pivot within and between the free-zone channel and the entire cavity as the ball pivot is rotated and a load is applied along the axis of the ball pivot shaft such that the ball pivot is supported by the ball bearings regardless of the load direction and angle towards the mounting surface.

2. A ball joint bearing assembly as claimed in claim 1, wherein the number of the plurality of ball bearings varies depending on the size of the housing and ball pivot.

3. A ball joint bearing assembly as claimed in claim 1, wherein the cover is attached to the housing by mechanical fasteners or welding.

4. A ball joint bearing assembly as claimed in claim 1, wherein the free-zone channel is machined into the housing and the cover.

* * * * *